United States Patent [19]

Goddard et al.

[11] Patent Number: 4,831,707

[45] Date of Patent: May 23, 1989

[54] METHOD OF PREPARING METAL MATRIX COMPOSITE MATERIALS USING METALLO-ORGANIC SOLUTIONS FOR FIBER PRE-TREATMENT

[75] Inventors: David M. Goddard, Powell; Richard W. Sexton, Dayton, both of Ohio

[73] Assignee: Fiber Materials, Inc., Biddeford, Me.

[21] Appl. No.: 570,319

[22] Filed: Jan. 13, 1984

Related U.S. Application Data

[63] Continuation-in-part of Ser. No. 206,846, Nov. 14, 1980, abandoned.

[51] Int. Cl.$^4$ .............................................. B22D 19/14
[52] U.S. Cl. ..................................... 29/419.1; 228/124
[58] Field of Search ............ 228/121, 124; 29/419 R, 29/419 G; 427/299; 428/608

[56] References Cited

U.S. PATENT DOCUMENTS

| | | | |
|---|---|---|---|
| 2,984,575 | 5/1961 | Fitch | 260/430 |
| 3,117,846 | 1/1964 | Paojenchao | 427/383.9 X |
| 3,550,247 | 12/1970 | Evans et al. | 29/419 |
| 3,571,901 | 6/1969 | Sara | 29/419 R |
| 3,622,283 | 11/1971 | Sara | 428/608 |
| 3,663,280 | 5/1972 | Lee | 427/226 X |
| 3,676,916 | 7/1972 | Schierding et al. | 29/419 |
| 3,720,535 | 3/1973 | Parish et al. | 427/226 X |
| 3,740,822 | 6/1973 | Singleton | 29/419 |
| 3,827,129 | 8/1974 | Denham | 29/419 |
| 3,835,514 | 9/1974 | Pollack | 29/419 |
| 3,859,114 | 1/1975 | Pepper et al. | 427/299 |
| 3,908,047 | 9/1975 | Beuther et al. | 427/226 X |
| 3,918,141 | 11/1975 | Pepper et al. | 29/419 |
| 4,033,668 | 7/1977 | Presby | 228/121 X |
| 4,044,447 | 8/1977 | Hamada et al. | 29/419 |
| 4,055,887 | 11/1977 | Meyer | 29/419 |
| 4,082,864 | 4/1978 | Kendall et al. | 427/226 X |
| 4,116,688 | 9/1978 | Kaarlela | 29/419 X |
| 4,130,671 | 12/1978 | Nagesh et al. | 427/229 X |
| 4,136,348 | 1/1979 | Damene | 427/383.9 X |
| 4,150,776 | 4/1979 | Lesgoarguer | 29/419 X |
| 4,167,240 | 9/1979 | Schaaf | 228/124 |
| 4,206,251 | 6/1980 | Chen | 427/226 X |
| 4,243,715 | 1/1981 | Gordon | 427/229 X |
| 4,282,922 | 8/1981 | Hartmann | 29/419 X |
| 4,292,725 | 10/1981 | Larson et al. | 29/419 R |
| 4,329,016 | 5/1982 | Chen | 427/100 X |
| 4,332,879 | 6/1982 | Pastor et al. | 427/229 X |

*Primary Examiner*—Kenneth J. Ramsey
*Attorney, Agent, or Firm*—John L. Gray

[57] ABSTRACT

Glass or ceramic fibers or other fibers such as graphite properly protected by a suitable adherent ceramic or metal coating are immersed in a liquid metallo-organic solution containing a noble metal compound as a primary ingredient, then dried and fired in air or in a slightly oxidizing atmosphere so as to produce a noble metal coating on the fibers. Fibers may be in the form of individual filaments, as a multifilament tow or yarn or as a woven fabric. The fibers coated with a nobel metal are then incorporated into a metal matrix composite material by immersion in a molten bath of the desired matrix metal, placing the fibers in a suitable mold and casting the molten matrix metal around them or placing the fibers between solid sheets of matrix metal and effecting consolidation by diffusion bonding. The coating thickness on the fibers should be at least 0.30 microns and should not exceed 0.50 microns. By staying within this range, adequate wetting by the metal matrix material coupled with maximum matrix purity are achieved. Optimum reproducibility of fiber infiltration and optimum effectiveness of fiber strengthening in the composite are achieved at the upper end of this range.

5 Claims, No Drawings

METHOD OF PREPARING METAL MATRIX COMPOSITE MATERIALS USING METALLO-ORGANIC SOLUTIONS FOR FIBER PRE-TREATMENT

INTRODUCTION

This is a continuation-in-part of U.S. patent application Ser. No. 206,846, now abandoned, entitled "Method of Preparing Metal Matrix Composite Materials Using Metallo-Organic Solutions for Fiber Pre-Treatment."

SUMMARY OF INVENTION

The present invention comprises a process for preparing metal matrix composites which are reinforced by ceramic or glass fibers or other fibers which have been suitably coated, wherein the fibers are pretreated in a precious metal metallo-organic (resinate) solution followed by heating the fibers in air so as to produce a precious metal coating on the fibers. The coated fibers are then immersed in a molten bath of the desired matrix metal, placed in a suitable mold and then the molten matrix metal is cast around the fibers, or the fibers are placed between solid sheets of matrix metal and consolidation is effected by diffusion bonding.

The coating thickness on the fibers should be at least 0.30 microns and should not exceed 0.50 microns. By staying within this range, adequate wetting by the metal matrix material coupled with maximum matrix purity are achieved. Optimum reproducibility of fiber infiltration and optimum effectiveness of fiber strengthening in the composite are achieved at the upper end of this range.

Metal Matrix composite materials consisting typically of high-strength, high-modulus nonmetallic fibers in a metal matrix, have great potential for use in a wide variety of industrial and military applications, because they offer a combination of the physical properties of a metal (e.g., electrical and thermal conductivity, corrosion and wear resistance) with the mechanical properties of the fibers. In order for the optimum mechanical properties to be achieved in the composite, good bonding must occur between the fiber and the matrix. However, the formation of the bond must not significantly attack the fiber, or else the fiber strength and hence the composite strength may be reduced appreciably.

In the preparation of a metal matrix composite, the fibers and the metal are joined together either by solid state diffusion bonding or by infiltration of a group of fibers with molten metal. Typically, solid state processes are used for larger diameter (approximately 100 microns) or chopped fibers, while liquid infiltration is used for small diameter (5 to 25 microns) fibers that are usually present in multifilament yarns. Liquid metal processes require wetting to occur between the fiber and the matrix. Often this does not occur spontaneously, so a wettable coating is first applied to the fibers. Examples of coatings and coating processes used in the past include titanium boride coatings applied by chemical vapor deposition (U.S. Pat. No. 3,860,443, Lachman, et al.), nickel coatings applied by electrodeposition (U.S. Pat. No. 3,622,283, Sara), and sodium coatings applied by immersion of the fibers in molten sodium (U.S. Pat. No. 3,859,114, Pepper, et al.). While all three coating procedures are capable of promoting infiltration of fiber bundles with molten metals, the first two procedures require sophisticated equipment and close control over the processing parameters, while the third procedure poses substantial safety problems in the handling of molten sodium. In solid state bonding processes, fiber-metal bonding depends upon a reaction between the two materials. If this reaction cannot be closely controlled, loss of fiber strength may occur. It is sometimes advantageous, therefore, to coat the fibers with an intermediate substance that bonds to both the fiber and the matrix without excessively reacting with either during the bonding process.

It is therefore an object of this invention to prepare metal matrix composite materials by first coating glass or ceramic fibers, or other fibers, such as graphite properly protected by a suitable adherent ceramic or metal coating, with a noble metal.

It is another object of this invention to provide such a noble metal coating by immersing said fibers in a liquid metallo-organic solution containing a noble metal compound as a primary ingredient.

It is still another object of this invention to provide such a noble metal coating having an optimum coating thickness on the fibers so as to achieve adequate wetting by the metal matrix material and optimum reproducibility of fiber infiltration and optimum effectiveness of fiber strengthening in the composite coupled with maximum matrix purity.

It is a still further object of this invention to produce a metal matrix composite material utilizing said noble metal coated fibers, by immersion of said fibers in a molten bath of the desired matrix material, by placing the fibers in a suitable mold and casting the molten matrix metal around said fibers, or by placing the fibers between solid sheets of matrix metal and effecting consolidation by diffusion bonding.

This together with other objects and advantages of the invention should become apparent in the details of the invention as more fully described hereinafter and claimed.

DETAILED DESCRIPTION OF THE INVENTION

If the ceramic or glass fibers, or graphite fibers coated with a ceramic or metal casing, are coated with a noble metal-containing metallo-organic compound and subsequently fired (heated in air), a continuous adherent coating of noble metal is obtained which provides an excellent bond with the subsequently introduced metal matrix of the composite material. While silver is a preferred noble metal, gold, palladium, or platinum films may also be used. All of these films are continuous and adhere to the glass or ceramic fiber. Graphite fibers have been found to be unsuitable unless first coated with an adherent ceramic material or an appropriate metal. Among the metal coating materials for graphite fibers, nickel, aluminum, titanium, magnesium, and stainless steel are found to be useful.

A noble metal-containing metallo-organic material which has been found to be very useful is that disclosed in U.S. Pat. No. 2,984,575, Fitch.

The ceramic and glass fibers utilized in the present invention may include any of the commercial glass fibers, such as E-glass, S-2 glass, or quartz glass; any of the polycrystalline oxide fibers, such as pure alumina or an alumina-boria-silica mixture; or any other nonmetallic compound fiber, such as silicon carbide, whether present as a homogeneous material or as a coating on a fiber of a dissimilar material. The fibers may be utilized as monofilaments, as multifilament yarns, or as a woven fabric.

The matrix metals utilized in the present invention may include, but are not limited to, any of the following: aluminum and its alloys, lead and its alloys, or tin and its alloys. Methods of incorporating the fibers into the metal matrix include immersion of the fibers in a molten bath of the matrix metal, followed by removal of the metal-coated fibers from the bath where the attached metal is allowed to solidify in air; placing the fibers within a suitably designed casting mold and pouring the molten matrix metal into the mold, preferably using a vacuum assist to aid in filling the interslices between the fibers; and hot pressing the fibers between solid sheets of the matrix metal, a procedure that is most suitable for relatively large diameter (approximately 100 microns) monofilaments.

In all cases, the fibers are first pretreated by immersing them in a precious metal (in the most preferred embodiment, a silver) metallo-organic (resinate) solution containing suitable bonding and fluxing ingredients; an example of such a solution is marketed under the trade name of Organic Silver Ink Number A-2282, sold by Engelhard Industries, East Newark, N.J. The solution may also be applied to the fibers by brushing or spraying. The fibers may be treated individually or in a bundle of a size that is desired for the metal composite part. After treatment in the metallo-organic solution, the fibers are heated in air according to the solution manufacturer's instructions, in order to volatilize the organic constituents of the solution and to deposit a precious metal film on the fiber surfaces. The so treated fibers are then incorporated into a metal matrix as previously described.

The following examples of fiber and matrix compositions which have been prepared in accordance with the present invention, will illustrate the application of the invention to a variety of materials.

EXAMPLE 1

A bundle of S-2 glass fibers was immersed in a silver metallo-organic solution, trade name Organic Silver Ink No. A-2282 (Engelhard Industries). Immersion time was approximately two seconds, after which the fiber bundle was removed from the solution at a moderate rate. The fibers were then placed in a drying oven at 125° C., in air, for ten minutes. Next, the fibers were fired by heating them in air, at a rate of approximately 50° C./min. to 600° C., held at 600° C. for ten minutes, and air cooled. The treated fibers, each fiber coated with a uniform layer of silver, were then immersed in a bath of molten lead at 450° C., in air, for ten seconds. After the fibers had been removed from the lead bath and allowed to air cool, examination revealed that lead had coated and penetrated the fiber bundle, forming a glass fiber reinforced lead composite rod.

EXAMPLE 2

A six-inch length of woven fiberglass (S-2 glass) tape, one inch wide, was immersed in the silver metallo-organic solution referred to in Example 1, air dried, and heated in air at 600° C. for ten minutes as in Example 1. The silver-coated tape was immersed, in air, for ten seconds in a bath of molten lead at 450° C. The tape was removed from the lead bath and air cooled. The lead had coated and infiltrated the weave of the tape, forming a lead composite reinforced in two directions with glass fibers. The resultant article was much stiffer and stronger than a similar size piece of unreinforced lead.

EXAMPLE 3

A bundle of ceramic oxide fibers, marketed by the 3M Company under the name Nextel 312, was treated by the same process as set forth in Example 1. Upon examination of the final product, it was observed that the lead had coated and infiltrated the fiber bundle, forming a lead composite reinforced with ceramic oxide fibers.

EXAMPLE 4

A bundle of quartz glass fibers was treated by the same process as set forth in Example 1. Upon examination of the final product, it was observed that the lead had coated and infiltrated the quartz glass fibers and the resulting product was a quartz glass fiber reinforced lead composite.

EXAMPLE 5

A bundle of ceramic oxide fibers (Nextel 312, as in Example 3) was treated by the same process as set forth in Example 1, except that the molten metal bath, instead of being lead, was a thin babbitt alloy consisting of approximately 90 percent tin, balance copper and antimony. The temperature of this bath was 400° C. Immersion of the treated fiber bundle in this bath, in air, for ten seconds produced metal coating and infiltration of the fiber bundle.

EXAMPLE 6

A bundle of continuous silicon carbide filaments, each filament approximately 13 microns in diameter, manufactured by Nippon Carbon Company (Japan) under the trade name Nicalon, was immersed in the silver metallo-organic solution of Example 1., dried, and heated in air at 600° C. for ten minutes as in Example 1. The fibers, so coated with silver, were placed in a rectangular cavity, ⅛ inch by ⅛ inch by 8 inches long, within a plaster mold; the fibers constituted approximately ten volume percent of this cavity. The plaster contained a pouring sprue, a runner channel for molten metal, and a gate for molten metal to enter the cavity containing the fibers. An aluminum-base alloy (alloy 201) was heated to 850° C. and poured into the sprue of the plaster mold; vacuum was used to assist filling of the mold cavity. After the metal had solidified in the mold, the ⅛ inch by ⅛ inch by 8 inches bar was removed and examined. It was found that the aluminum alloy had coated and penetrated the fiber bundle and filled the cavity.

EXAMPLE 7

S-2 glass fibers were treated, placed in a mold, and pure molten lead was introduced to produce a fiber-reinforced rectangular bar as in Example 6. After the metal had solidified into the mold and the bar had been removed, on examination it was found that the lead had coated and penetrated the fiber bundle and filled the cavity.

EXAMPLE 8

A bundle of pitch-base graphite fibers (Union Carbide VSB-32) was treated in the metallo-organic solution of Example 1 and air dried as in Example 1. However, during the higher temperature (600° C.) firing step, the fibers were observed to glow red hot and, after removal from the furnace, much of the fiber had disappeared, presumably by oxidation to a gaseous reaction product. An attempt was made to preserve the fibers by heating in an atmosphere of wet argon rather than air. The fibers so treated did not disintegrate as they had in air. However, the silver coating was not adherent to the fibers, and the treated fiber bundle was not infiltrated when immersed in a lead bath.

EXAMPLE 9

A bundle of pitch-base graphite fibers (Union Carbide VSB-32) identical to the fibers of Example 8 was coated with nickel by electrodeposition. The nickel coated fibers were then treated in the metallo-organic solution of Example 1 and air dried as in Example 1. Next the nickel-coated fibers were heated in air at a rate of approximately 50° C. per minute to 600° C. held at 600° C. for ten minutes and air cooled. The nickel coating on the fibers prevented them from disintegrating when exposed to this high temperature. Thereafter, the treated fibers now coated with both nickel and silver were then immersed in a bath of molten lead at 400° C. in air for ten seconds. After the fibers had been removed from the lead bath and allowed to cool, examination revealed that lead had coated and penetrated the fiber bundle forming a graphite fiber reinforced lead composite.

EXAMPLE 10

A bundle of ceramic oxide fibers (Nextel 312) was dipped in a metallo-organic solution (silver resinate), dried in air for ten minutes at 125° C. and fired in air for ten minutes at 600° C. The coated fibers were then weighed to determine the weight of silver coating added. From this weight, the original known fiber weight, the densities of the fiber and silver, and the fiber diameter of 11 microns, the coating thickness was calculated to be 0.30 microns. The process was repeated and the resulting change in coated fiber weight indicated that an additional 0.15 microns of silver coating had been added, for a total thickness of 0.45 microns. The fibers were then immersed in molten lead. The fiber bundle was wetted and infiltrated by the molten lead.

EXAMPLE 11

Both E-glass and quartz-glass fibers were coated with metallo-organic solutions (silver resinate), dried in air for ten minutes at 125° C. and fired in air for ten minutes at 600° C. Some of the coated fibers were then dipped in the metallo-organic (silver resinate) solution, dried in air for ten minutes at 125° C. and fired in air for ten minutes at 600° C. Thus fibers having a coating of 0.30 microns and approximately, 0.45 to 0.50 microns were obtained. The treated fiber samples were then placed in separate cavities in a plaster mold and fiber reinforced lead bars were cast from them using vacuum-assisted filling. All of the completed bars exhibited good and equivalent degrees of wetting and infiltration of the fibers by the lead. The bars were then tensile tested to failure. The bars containing the fibers that had had an additional coating of noble metal to increase the thickness to approximately 0.50 microns broke at a 17 percent higher load than did the same matrix which contained fibers containing a 0.30 noble metal thickness coating.

EXAMPLE 12

Numerous lead composites, reinforced with fibers such as Nextel 312 and E-glass, produced by the process described in the above examples, have been examined metallographically under the microscope. As a result of this examination, it is concluded that a second phase is present in the nominally pure lead matrix, especially in regions immediately adjacent to the fibers. This phase has been identified as a silver-rich (nominally 98.5% Ag, balance Pb) solid solution which forms as part of a eutectic reaction on solidification.

Lead can contain very little silver in solid solution. In fact, it can contain a maximum of 0.1 percent and since the eutectic forms at a very low (2.5%) silver content in the lead-silver alloy system, the presence of the eutectic in the microstructure in the above example is not surprising. The silver fiber coating does at least partially dissolve in the matrix as part of the wetting process. Thus, in order to obtain a high degree of matrix purity, the amount of coating material available for dissolution in the matrix must be minimized.

From the above it may be concluded that a minimum thickness of 0.30 microns on the fibers is desirable in order to obtain infiltration in the matrix and a maximum of 0.5 microns is desirable in order to minimize the amount of coating material dissolved in the matrix.

The composite materials formed by this process are stiffer and stronger than the unreinforced infiltrating metal. Axial strengths of the fibers within the composite depend on the fiber type, but typically vary from approximately 100,000 psi for the S-2 glass to 250,000 psi for the silicon carbide. Strength of the composite material is a function of the type and the amount of fiber present.

While this invention has been described in its preferred embodiment, it is appreciated that variations thereon may be made without departing from the proper scope and spirit of the invention.

What is claimed is:

1. A method of making a composite material from a fiber selected from the group consisting of glass, ceramic, metal, and any fiber coated with a material selected from the group consisting of glass, ceramic and metal, and comprising the steps of:
   coating said fiber with a noble metal containing metallo-organic liquid compound,
   heating said fiber with said metallo-organic coating to a temperature at which said noble metal is deposited on said fiber, said noble metal being from 0.30 microns to 0.50 microns in thickness,
   and bonding the resultant noble metal coated fiber to a dissimilar metal matrix,
   said selected fiber being made of a material which will maintain its structural integrity at said temperature at which said noble metal is deposited on said fiber.

2. The method of claim 1 wherein said noble metal coated fiber is dipped into a dissimilar molten metal.

3. The method of claim 1 wherein said noble metal coated fiber has a dissimilar liquid metal cast around said fibers.

4. The method of claim 1 wherein said noble metal coated fiber is diffusion bonded to a dissimilar metal forming matrix.

5. The method of claim 1 wherein said noble metal containing metallo-organic liquid compound contains a resinate.

* * * * *